United States Patent
Grayfer et al.

(10) Patent No.: US 7,922,791 B2
(45) Date of Patent: Apr. 12, 2011

(54) FILTERING SYSTEM FOR A SEMICONDUCTOR PROCESSING TOOL

(75) Inventors: Anatoly Grayfer, Newton, MA (US);
Oleg P. Kishkovich, Greenville, RI (US)

(73) Assignee: Entegris, Inc., Billerica, MA (US)

( * ) Notice: Subject to any disclaimer, the term of this patent is extended or adjusted under 35 U.S.C. 154(b) by 265 days.

(21) Appl. No.: 12/309,167

(22) PCT Filed: Jul. 13, 2007

(86) PCT No.: PCT/US2007/016011
§ 371 (c)(1),
(2), (4) Date: Jan. 9, 2009

(87) PCT Pub. No.: WO2008/008497
PCT Pub. Date: Jan. 17, 2008

(65) Prior Publication Data
US 2009/0320681 A1    Dec. 31, 2009

Related U.S. Application Data

(60) Provisional application No. 60/830,737, filed on Jul. 13, 2006.

(51) Int. Cl.
*B01D 53/04*    (2006.01)
*B01D 46/00*    (2006.01)

(52) U.S. Cl. ............................ 95/141; 423/245.1

(58) Field of Classification Search ........... 95/141, 95/143; 96/131, 132; 423/210, 245.1
See application file for complete search history.

(56) References Cited

U.S. PATENT DOCUMENTS

| | | |
|---|---|---|
| 3,019,127 A | 1/1962 | Czerwonka et al. |
| 3,409,691 A | 11/1968 | Small |
| 3,607,706 A | 9/1971 | Eisenmann et al. |
| 3,998,988 A | 12/1976 | Shimomai et al. |
| RE29,410 E | 9/1977 | Yoshino |
| 4,055,075 A | 10/1977 | Allan et al. |

(Continued)

FOREIGN PATENT DOCUMENTS

DE    4413606 A1    11/1995

(Continued)

OTHER PUBLICATIONS

International Preliminary Examination Report for PCT/US99/19244, dated Sep. 11, 2000.

(Continued)

*Primary Examiner* — Frank M Lawrence
(74) *Attorney, Agent, or Firm* — Hamilton, Brook, Smith & Reynolds, P.C.

(57) ABSTRACT

The present invention provides a filtering system for a semiconductor processing tool. In one embodiment, the filtering system is associated with the semiconductor processing tool. A system of the invention comprises a first and second filter layer in fluid communication with a gas flow path. The flow path is a gas stream comprising volatile silica containing compounds such as hexamethyldisiloxane and trimethylsilanol. The gas flow path passes through the first and second filter layer to fluidly communicate with the semiconductor processing tool. Preferably, the first filter layer of the filtering system is upstream along the gas flow path from the second filter layer. The medias of the first and second filter layers are selected and arranged based on given contaminant concentrations. The invention also provides a method for filtering gas containing hexamethyldisiloxane and trimethylsilanol in communication with a semiconductor processing tool, which employs a system comprising a first and second filter layer.

21 Claims, 4 Drawing Sheets

U.S. PATENT DOCUMENTS

| | | | |
|---|---|---|---|
| 4,072,793 | A | 2/1978 | Watanabe et al. |
| 4,135,896 | A | 1/1979 | Parish et al. |
| 4,204,011 | A | 5/1980 | Tanabe et al. |
| 4,224,415 | A | 9/1980 | Meitzner et al. |
| 4,313,832 | A | 2/1982 | Shimizu et al. |
| 4,322,230 | A | 3/1982 | Schoen et al. |
| 4,629,479 | A | 12/1986 | Cantoni |
| 4,760,423 | A | 7/1988 | Holtje et al. |
| 4,808,202 | A | 2/1989 | Nishikawa et al. |
| 4,852,133 | A | 7/1989 | Ikeda et al. |
| 4,946,480 | A | 8/1990 | Hauville |
| 4,981,501 | A | 1/1991 | Von Blëucher et al. |
| 5,023,654 | A | 6/1991 | Matsumoto et al. |
| 5,039,321 | A | 8/1991 | Satoh et al. |
| 5,130,743 | A | 7/1992 | Katoh et al. |
| 5,133,864 | A | 7/1992 | Vaughn et al. |
| 5,143,552 | A | 9/1992 | Moriyama |
| 5,166,530 | A | 11/1992 | McCleary |
| 5,181,819 | A | 1/1993 | Sakata et al. |
| 5,204,055 | A | 4/1993 | Sachs et al. |
| 5,219,464 | A | 6/1993 | Yamaga et al. |
| 5,290,345 | A | 3/1994 | Osendorf et al. |
| 5,300,604 | A | 4/1994 | Nasman et al. |
| 5,306,321 | A | 4/1994 | Osendorf |
| 5,328,758 | A | 7/1994 | Markell et al. |
| 5,340,656 | A | 8/1994 | Sachs et al. |
| 5,387,380 | A | 2/1995 | Cima et al. |
| 5,399,377 | A | 3/1995 | Economy et al. |
| 5,430,303 | A | 7/1995 | Matsumoto et al. |
| 5,434,644 | A | 7/1995 | Kitano et al. |
| 5,459,943 | A | 10/1995 | Tanahashi |
| 5,462,485 | A | 10/1995 | Kinkead |
| 5,486,410 | A | 1/1996 | Groeger et al. |
| 5,514,196 | A | 5/1996 | Tanahashi et al. |
| 5,582,865 | A | 12/1996 | Rezuke et al. |
| 5,605,746 | A | 2/1997 | Groeger et al. |
| 5,607,647 | A | 3/1997 | Kinkead |
| 5,616,169 | A | 4/1997 | De Ruiter et al. |
| 5,626,820 | A | 5/1997 | Kinkead et al. |
| 5,647,356 | A | 7/1997 | Osendorf et al. |
| 5,675,752 | A | 10/1997 | Scott et al. |
| 5,685,895 | A | 11/1997 | Hagiwara et al. |
| 5,743,927 | A | 4/1998 | Osendorf |
| 5,753,345 | A | 5/1998 | Kuma et al. |
| 5,772,738 | A | 6/1998 | Muraoka |
| 5,772,884 | A | 6/1998 | Tanaka et al. |
| 5,783,608 | A | 7/1998 | Sugo et al. |
| 5,807,424 | A | 9/1998 | De Ruiter et al. |
| 5,833,726 | A | 11/1998 | Kinkead et al. |
| 5,834,114 | A | 11/1998 | Economy et al. |
| 5,856,198 | A | 1/1999 | Joffe et al. |
| 5,890,367 | A | 4/1999 | You et al. |
| 5,906,429 | A | 5/1999 | Mori et al. |
| 5,928,792 | A | 7/1999 | Moya |
| 5,944,878 | A | 8/1999 | Lindhe |
| 5,964,927 | A | 10/1999 | Graham et al. |
| 6,013,821 | A * | 1/2000 | Lopez .................. 556/428 |
| 6,033,573 | A | 3/2000 | Toles et al. |
| 6,056,805 | A | 5/2000 | Litwin et al. |
| 6,096,267 | A | 8/2000 | Kishkovich et al. |
| 6,162,281 | A | 12/2000 | Ammann et al. |
| 6,207,460 | B1 | 3/2001 | Kishkovich et al. |
| 6,228,135 | B1 | 5/2001 | Sugo et al. |
| 6,296,806 | B1 | 10/2001 | Kishkovich et al. |
| 6,352,579 | B1 | 3/2002 | Hirata et al. |
| 6,398,846 | B1 | 6/2002 | Lorimer et al. |
| 6,447,584 | B1 | 9/2002 | Kishkovich et al. |
| 6,533,847 | B2 | 3/2003 | Seguin et al. |
| 6,610,128 | B2 | 8/2003 | Kishkovich |
| 6,740,147 | B2 | 5/2004 | Kishkovich et al. |
| 6,761,753 | B2 | 7/2004 | Kishkovich et al. |
| 6,770,736 | B1 | 8/2004 | Haftka et al. |
| 6,916,360 | B2 | 7/2005 | Seguin et al. |
| 7,014,693 | B2 | 3/2006 | Kishkovich et al. |
| 7,022,164 | B2 | 4/2006 | Kishkovich et al. |
| 7,049,382 | B2 | 5/2006 | Haftka et al. |
| 7,132,011 | B2 * | 11/2006 | Shellhammer et al. ......... 96/135 |
| 7,264,648 | B1 * | 9/2007 | Wetzel et al. ...................... 95/8 |
| 2002/0078828 | A1 | 6/2002 | Kishkovich et al. |
| 2002/0110510 | A1 | 8/2002 | Seguin et al. |
| 2004/0154470 | A1 | 8/2004 | Kishkovich et al. |
| 2006/0078827 | A1 | 4/2006 | Hacker et al. |
| 2006/0169139 | A1 | 8/2006 | Kishkovich et al. |

FOREIGN PATENT DOCUMENTS

| | | |
|---|---|---|
| DE | 19859788 C1 | 3/2000 |
| EP | 0335034 A1 | 10/1989 |
| EP | 0398847 A2 | 11/1990 |
| EP | 0584030 A1 | 2/1994 |
| EP | 1 022 043 A1 | 7/2000 |
| EP | 1105203 B1 | 1/2004 |
| JP | 03-038212 | 2/1991 |
| JP | 06-063333 | 3/1994 |
| JP | 06-198123 | 7/1994 |
| JP | 08-024534 | 1/1996 |
| JP | 08-168628 | 7/1996 |
| JP | 10-165730 | 6/1998 |
| JP | 10-165744 | 6/1998 |
| JP | 10-192624 | 7/1998 |
| WO | WO 00/07696 A1 | 2/2000 |
| WO | WO 00/25896 A1 | 5/2000 |
| WO | WO 01/85308 A2 | 11/2001 |

OTHER PUBLICATIONS

Notification of Transmittal of International Preliminary Examination Report from counterpart International Application No. PCT/US2001/14655, dated Oct. 9, 2002.

Written Opinion from counterpart International Application No. PCT/US2001/14655, dated Aug. 9, 2002.

Notification of Transmittal of International Search Report from counterpart International Application No. PCT/US1999/19244, dated Dec. 17, 1999.

Author Unknown, "Donaldson LITHOGUARD®-12 Chemical Contamination Filter System", *Donaldson Filtration Systems*, 2 pages (Jun. 2004).

Donaldson LithoGuard Filtration Systems Brochure, pp. 1-4 (2001) (month of publication not available).

Kishkovich, O., et al., "An Accelerated Testing Technique for Evaluating Performance of Chemical Air Filters for DUV Photolithographic Equipment," *SPIE (Part of the SPIE Conference on Metrology, Inspection and Process Control for Microlithography XIII*, Santa Clara, CA), 3677: 857-865 (Mar. 1999).

International Search Report for PCT/US2007/016011, dated Dec. 5, 2007.

International Preliminary Report on Patentability for PCT/US2007/016011, dated Oct. 10, 2008.

International Search Report for PCT/US2001/14655, dated Aug. 7, 2002.

* cited by examiner

FILTERING SYSTEM FOR A SEMICONDUCTOR PROCESSING TOOL

RELATED APPLICATIONS

This application is the U.S. National Stage of International Application No. PCT/US2007/016011, filed Jul. 13, 2007, published in English, and claims the benefit of U.S. Application No. 60/830,737, filed Jul. 13, 2006, the entire contents of which is incorporated herein by reference.

BACKGROUND OF THE INVENTION

The overall quality of gases is of growing concern within semiconductor manufacturing facilities. In general, tremendous efforts are made to eliminate yield reducing contaminants from air used for semiconductor processing tools. For example, contaminants are viewed as molecular compounds present in a gas that can inhibit semiconductor processing tool performance through deposit formations. With lithography tools, gases are employed to purge and actuate tool components. Contaminants such as volatile silicon containing compounds in these gases are usually present at levels capable of damaging lithography tool optics.

Typically, volatile silicon containing compounds such as hexamethyldisiloxane and trimethylsilanol adhere to lithography tool optics, for example, projection lenses forming molecular films. These molecular films can physically absorb and scatter light, which distort wavefront qualities. When distorted, lithography tool images are abberated or mis-formed, preventing accurate circuit pattern formation onto a reticle. In addition to forming molecular films, contaminants can also degrade lithography tool optics. For example, hexamethyldisiloxane and trimethylsilanol can irreversibly degrade projection lenses, reducing fabrication yields.

Contaminants such as volatile silicon containing compounds hexamethyldisiloxane and trimethylsilanol pose particular concerns in microlithography tools. Other common lithography tool contaminants include acids such as hydrobromic acid, nitric acid, sulfuric acid, phosphoric acid or hydrochloric acid, bases such as tetramethylammonium hydroxide, ammonia, ammonium hydroxide, trimethylamine, methyl pyrrolidone, triethylamine, methylamine cyclohexylamine, ethanolamine, hexamethyldisilazane, dimethylamine, dimethylaminoethanol or morpholine, condensables such as hydrocarbons or silicones and dopants such as boric acid, organophosphate or arsenate.

The removal of hexamethyldisiloxane and trimethylsilanol from gases in semiconductor processing tools is often performed by filtering elements featuring intermixed chemisorptive and physisorptive medias. For example, such filter elements can include an acidic cation exchange resin intermixed with activated carbon. A filter element consisting of these chemisorptive and physisorptive medias can be mounted or coupled to a lithography tool. One shortcoming with filter elements having intermixed medias is that medias can exhaust at different rates, requiring less than optimal filter element replacements. Such different rates of exhaustion can also be exacerbated by varying concentrations and types of contaminants.

SUMMARY OF THE INVENTION

The present invention provides a filtering system for a semiconductor processing tool. Preferably, a system of the invention filters fluid supplied to a semiconductor processing tool via a gas stream or flow path. In one embodiment, the system comprises a first filter layer for removing contaminants present within a gas flow path. The gas flow path passes through the first filter layer and fluidly communicates with the semiconductor processing tool. Moreover, the system includes a second filter layer for removing contaminants from the gas flow path, which passes therethrough upstream from the first filter layer. A system of the invention can overcome the shortcoming described above in which filtering elements have intermixed medias that exhaust at different rates.

For example, a microlithography tool can be introduced to a gas flow path comprising a higher contaminant concentration of hexamethyldisiloxane or trimethylsilanol. These molecular compounds can exhaust chemisorptive and physisorptive medias that are intermixed in a conventional filter element at different rates, resulting in premature replacement of a given media. By having the system of the invention comprising a first filter layer upstream from a second filter layer, such premature media replacement may be overcome as chemisorptive and physisorptive medias can be selected and arranged based on particular contaminant concentrations.

A system of the invention comprises a first and second filter layer in fluid communication with a gas flow path comprising contaminants such as volatile silicon containing compounds. For example, volatile silicon containing compounds hexamethyldisiloxane and trimethylsilanol can be present in the gas flow. In one embodiment, contaminant concentrations of hexamethyldisiloxane in the gas flow path are higher than that of trimethylsilanol. With higher contaminant concentrations of hexamethyldisiloxane, as compared to other volatile silicon containing compounds such as trimethylsilanol, the first and second filter layers comprise physisorptive and chemisorptive media, respectively.

For a gas flow having higher contaminant concentrations of trimethylsilanol than other volatile silicon containing compounds such as hexamethyldisiloxane, the first and second filter layers for a system of the invention comprise chemisorptive and physisorptive media, respectively. Preferably, chemisorptive media is capable of removing higher contaminant concentrations of hexamethyldisiloxane as compared to trimethylsilanol. In addition, a physisorptive media is also capable of removing higher contaminant concentrations of trimethylsilanol than hexamethyldisiloxane.

In one embodiment, a system of the invention comprises a first filter layer having a physisorptive media. An exemplary physisorptive media can include activated carbon. Activated carbon of a physisorptive media can be untreated or treated and granulated. A system of the invention also features a second filter layer comprising a chemisorptive media. For example, a chemisorptive media for a second filter layer can include a cation exchange resin. Preferably, the cation exchange resin comprises a copolymer such as a divinyl benzene styrene copolymer having at least one acidic functional group.

Another embodiment for a system of the invention comprises a first filter layer having a chemisorptive media. The system of the invention also comprises a second filter layer featuring a physisorptive media. Preferably, a gas flow path passes through the first and second filter layers to be introduced to a semiconductor processing tool. For example, a semiconductor processing tool in fluid communication with the gas flow path can include lithography, etching, deposition or implantation tools. A system of the invention can be associated with such semiconductor processing tools to filter gases circulating within the tool.

The invention also provides a method for filtering gas in communication with a semiconductor processing tool. In one embodiment, the method comprises providing a system comprising a first and second filter layer. The method also comprises providing a gas flow path to the system. For example, the flow path is a gas stream comprising volatile silicon containing compounds such as hexamethyldisiloxane and trimethylsilanol. The contaminants present in the gas flow path are removed by the first and second filter layers of the system. The gas flow path is also employed in operation of a semiconductor processing tool. The method of the invention can also be performed in any suitable order such as, for example, removing contaminants via a second filter layer prior to a first.

DESCRIPTION OF THE DRAWINGS

Other features and advantages of the invention may also be apparent from the following detailed description thereof, taken in conjunction with the accompanying drawings of which.

DEFINITIONS

Figure 1:
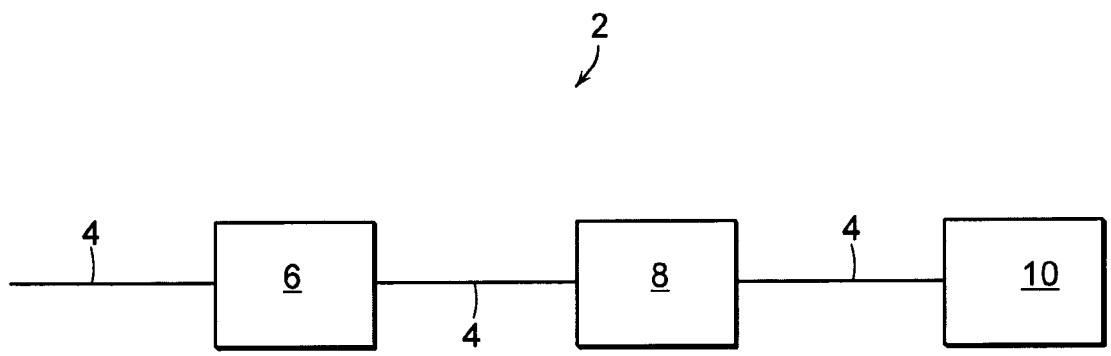
FIG. 1 is a representation of a filtering system of the invention.

Unless otherwise stated, the following definitions provide meaning and examples to terms used herein. Such definitions are also intended to encompass any meaning that may be contemplated by a person of ordinary skill within the art.

The terms "contaminant concentration" or "concentration" and derivations thereof generally refer to a level of contaminants present in a fluid such as air or gas. For example, the level of contaminants can be based on weights, amounts, moles, quantities, percentages, concentrations or combinations thereof of molecular compounds present within a gas.

DETAILED DESCRIPTION OF THE INVENTION

The invention provides a filtering system for a semiconductor processing tool. In a preferred embodiment, the filtering system is associated with the semiconductor processing tool. For example, the filtering system can be arranged to be mounted or coupled to the semiconductor processing tool. A system of the invention comprises a first and second filter layer in fluid communication with a gas flow path. The gas flow path passes through the first and second filter layer to fluidly communicate with the semiconductor processing tool. The first filter layer is upstream along the gas flow path from the second filter layer.

The medias of a first and second filter layer for a system of the invention are selected and arranged given particular contaminant concentrations. Preferably, with higher contaminant concentrations of hexamethyldisiloxane as compared to other volatile silicon containing compounds, the first and second filter layers comprise physisorptive and chemisorptive media, respectively. For a gas flow having higher contaminant concentrations of trimethylsilanol than other volatile silicon containing compounds, the first and second filter layers for the system comprise chemisorptive and physisorptive media, respectively.

Preferably, a chemisorptive media is capable of removing higher contaminant concentrations of hexamethyldisiloxane as compared to trimethylsilanol. An exemplary chemisorptive media for a filter layer of a filtering system is a cation exchange resin such as a chemically acidic copolymer. In addition, a physisorptive media can be capable of removing higher concentrations of trimethylsilanol than hexamethyldisiloxane. A physisorptive media for a filter layer can include activated carbon, which can be untreated or treated and granulated. Physisorptive medias can be formed into a block held together by binder materials. Exemplary physisorptive medias can be chemically acid and obtained from organic sources such as coal.

Generally, trimethylsilanol present within a gas stream is considered to be a product of hexamethyldisiloxane hydrolysis under ambient conditions. In the presence of chemically acidic medias, humidified gaseous hexamethyldisiloxane and trimethylsilanol contaminants in a fluid such as air establish an equilibrium. An exemplary equilibrium comprises a ratio of hexamethyldisiloxane to trimethylsilanol of about 0.5 to 0.9. Such a ratio can be used to demonstrate that trimethylsilanol passes more rapidly through an activated carbon media than hexamethyldisiloxane, although these contaminants propagate through conventional intermixed activated carbon and cation exchange resin medias at comparable rates.

FIG. 1 is a representation of a filtering system of the invention. As shown, a system 2 of the invention comprises a fluid flow path or stream 4. Preferably, the fluid flow path 4 is a gas flow path such as, for example, a gas stream. In one embodiment, the gas flow path is substantially air. The fluid flow path 4 of the system 2 can comprise air and contaminants such as volatile silicon containing compounds. Examples of volatile silicon containing compounds include gaseous or vaporous hexamethyldisiloxane and trimethylsilanol. The fluid flow path 4 can also include particulates such as, for example, dust, lint and manufacturing debris.

In addition, the fluid flow path 4 of a system can include contaminants comprising acids such as hydrobromic acid, nitric acid, sulfuric acid, phosphoric acid or hydrochloric acid, bases such as tetramethylammonium hydroxide, ammonia, cyclohexylamine, hydroxide, trimethylamine, methyl pyrrolidone, triethylamine, methylamine, ammonium, ethanolamine, dimethylamine, morpholine, hexamethyldisilazane or dimethylaminoethanol, condensables such as hydrocarbons or silicones and dopants such as boric acid, organophosphate or arsenate. As shown, the system 2 of FIG. 1 also comprises a first filter layer 6. The first filter layer 6 is in fluid communication with the fluid flow path 4.

In one embodiment, the fluid flow path of FIG. 1 passes through the first filter layer 6. As shown, the fluid flow path is also in fluid communication with a second filter layer 8 of the system 2. For example, the fluid flow path 4 passes through the second filter layer 8. The first 6 and second filter layer 8 of the system 2 of FIG. 1 are capable of removing contaminants from the fluid flow path 4. Preferably, the first and second filter layer feature different medias for removing particular volatile silicon containing compounds present in the fluid flow path 4 passing therethrough.

The first filter layer 6 is upstream along the fluid flow path 4 from the second filter layer 8. In one embodiment, the first filter layer comprises a physisorptive media for removing higher contaminant concentrations of hexamethyldisiloxane in the fluid flow path 4 as compared to trimethylsilanol. The second filter layer 8 of the system can comprise a chemisorptive media for removing higher concentrations of trimethylsilanol present in the flow path than hexamethyldisiloxane. Alternatively, a system of the invention can comprise a first 6 and second filter layer 8 comprising chemisorptive and physisorptive media, respectively.

The system 2 can also comprise a third filter layer for removing particulates from the fluid flow path 4. Preferably, the third filter layer includes a particulate media for removing particulates from the fluid flow path 4 passing therethrough. The third filter layer can be disposed upstream or downstream along the fluid flow path 4 from the first 6 or second filter layer 8. The first 6 and second filter layer 8 of the system 2 can each comprise a filter member. Exemplary filter members for a system of the invention can comprise a plurality of filter elements.

In one embodiment, a first and second filter member can comprise a plurality of honeycombed or pleated filter elements. As shown, the system 2 of FIG. 1 also comprises a semiconductor processing tool 10. Preferably, the fluid flow path 4 of the system 2 fluidly communicates with the tool 10. For example, the fluid flow path 4 can be in fluid communication with the tool 10 disposed in a semiconductor cleanroom. The first 6 and second filter layers 8 can, for example, be arranged to be mounted or coupled to the semiconductor processing tool 10. For example, the filter layers can be incorporated into the tool to filter air circulating therein.

A first 6 and second filter layer 8 associated with the semiconductor processing tool 10 can each remove contaminants from the fluid flow path 4 such as volatile silicon containing compounds. Preferably, the first 6 and second filter layer 8 remove contaminants from the fluid flow path 4, which can fluidly communicate with the tool 10. Exemplary semiconductor processing tools include lithography, etching, deposition or implantation tools. Preferably, a lithography tool of a semiconductor cleanroom is a microlithography tool featuring a filtering system of the invention.

In one embodiment, a chemisorptive media for a first or second filter layer comprises a cation exchange resin. Preferably, a chemisorptive media for the first or second filter layer can be chemically acidic. The chemisorptive media is capable of removing contaminants such as volatile silicon containing compounds present in a fluid such as, for example, a gas stream. The chemisorptive media for the first or second filter layer is fluid permeable such that a gas flow path with contaminants can pass therethrough. The system of the invention can comprise a chemisorptive media upstream or downstream along a gas flow path from a physisorptive media.

A first or second filter layer of a system of the invention can employ a nonwoven composite material comprising at least one cation exchange resin that can bind to airborne contaminants. Exemplary first or second filter layers comprising a chemisorptive media and methods for fabricating such filter layers are generally described in U.S. Pat. Nos. 6,447,584, 6,740,147, 6,610,128 and 6,761,753, which are hereby incorporated by reference herein. A filter layer can also be fabricated via dry application of chemisorptive media to a nonwoven composite or carrier material, which is then heated and calendered.

For example, such a nonwoven composite material can be polyester. In one embodiment, the chemisorptive media is a porous divinyl benzene styrene copolymer including acidic functional groups. Exemplary acidic functional groups include sulfonic and carboxylic acid functional groups. The chemisorptive media can feature a pore size in the range of about 50 to 400 angstroms (Å). Moreover, a surface area of the media can be greater than about 20 squared meters per gram. For example, acidic functional groups of a benzene styrene copolymer can also feature an acidity level higher than about 1 milliequivalent per gram.

In one embodiment, a first or second filter layer comprises chemisorptive media particles distributed throughout a material such as, for example, a nonwoven, fiber matrix or polyester material. Preferably, chemisorptive media particles of a filter layer can include a cation exchange resin. For example, these media particles can be chemically acidic. Such media particles can feature exemplary particle sizes from about 0.3 to 1.2 millimeters (mm). Moreover, a chemisorptive media particle can, for example, have a porosity and average pore diameter of about 0.3 milliliters per gram and 250 Å, respectively.

A chemisorptive media for a first or second filter layer of a system of the invention is particularly useful for removing gaseous or vaporous molecular compounds in an air stream. Moreover, the chemisorptive media can be capable of removing particulates from a gas stream such as, for example, when particulates are greater in size than media pores. In another embodiment, the first or second filter layer of the system of the invention can comprise a physisorptive media. An exemplary physisorptive media is activated carbon. Activated carbon is generally described in U.S. Pat. Nos. 5,607,647 and 5,582,865, which are hereby incorporated by reference herein.

Preferably, a physisorptive media for a first or second filter layer of a system of the invention includes untreated activated carbon. The physisorptive media can alternatively include synthetic carbon materials such as, for example, described in U.S. Pat. No. 5,834,114, which is hereby incorporated by reference herein. Exemplary synthetic carbon materials can also be used in combination with activated carbon for a physisorptive media. In one embodiment, a filter layer comprising a physisorptive media comprises untreated and granulated activated carbon, which is capable of removing contaminants such as volatile silicon containing compounds present in a gas stream.

The physisorptive media for the first or second filter layer is fluid permeable such that a gas flow path with contaminants can pass therethrough. The system of the invention can comprise a physisorptive media upstream or downstream along a gas flow path from a chemisorptive media. Preferably, a first or second filter layer comprising a physisorptive media is capable of removing higher contaminant concentrations of trimethylsilanol as compared to hexamethyldisiloxane present in a fluid such as, for example, a gas stream. A physisorptive media for a first or second filter layer can also be capable of removing particulates from a gas stream such as, for example, when particulates are greater in size than media pores.

In one embodiment, a filter layer of a system of the invention can feature any suitable length, width or depth dimensions. Preferably, filter layer dimensions are selected or adapted for use with a given semiconductor processing tool. Moreover, a filter layer can also each comprise a filter member. For example, a filter member can comprise a plurality of pleated filter elements having a pleat spacing of about 1 inch. Filter member pleat spacing can depend on concentrations and types of contaminants present in a gas stream. A filter layer can also comprise a bed including particle or beaded media.

A filtering system can also comprise a detection apparatus by which to determine when a filter layer requires maintenance or replacement. Exemplary types of such an apparatus are generally described in U.S. Pat. Nos. 6,207,460, 6,096,267 and 6,296,806, which are hereby incorporated by reference herein. A detection apparatus is preferably in fluid communication with a gas flow path of a system of the invention. For example, the apparatus can assess concentrations of particulates and contaminants circulating in a semiconductor processing tool. These concentrations can be indicative of filter layer performance such that when volatile silicon containing compound concentrations exceed a given threshold, options regarding filter layer maintenance or replacement can be evaluated.

A filter layer of a system of the invention can also include sampling ports for fluidly communicating with a monitoring device, which evaluates filter layer performance. Preferably, a sampling port can be arranged between a first and second filter layer. Monitoring devices in fluid communication with a sampling port can be of any suitable type. Exemplary devices include concentrators, chromatographs, spectrometers, detectors or combinations thereof. A filter layer of a system of the invention can partially, substantially or completely filter a gas stream from particulates or contaminants.

In addition, a filter layer of a system of the invention can have any suitable type of construction. For example, a filter layer can comprise a conventional tray and rack apparatus such as a metal enclosure having perforated materials or screens for media retainment. As described above, a filter layer for the system of the invention can comprise or form honeycombed elements. Exemplary honeycombed elements can also include chemisorptive or physisorptive medias retained by a partially or completely filled honeycombed type structure. In one embodiment, a filter layer can comprise a monolithic porous or honeycombed type structure.

Figure 2:
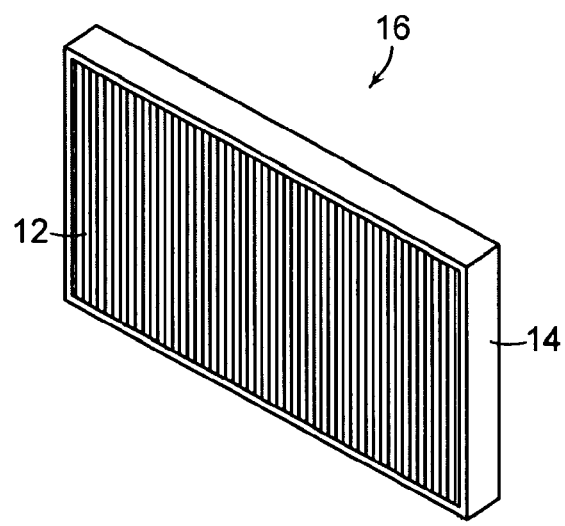
FIG. 2 is a representation of an exemplary filter layer of a system of the invention.

Alternatively, a first or second filter layer of a system of the invention can be a mat of woven or nonwoven polymeric fibers arranged into a conventional air filter comprising pleated elements. FIG. 2 is a representation of an exemplary filter layer of a system of the invention. As shown, pleated elements 12 are exposed on each surface of a frame 14 of the filter layer 16. In one embodiment, the filter layer 16 can be used in conventional or modified stack arrangements. For example, the filter layer can feature dimensions suitable for convenient replacement of existing filter layers in such stack arrangements.

Figure 3:
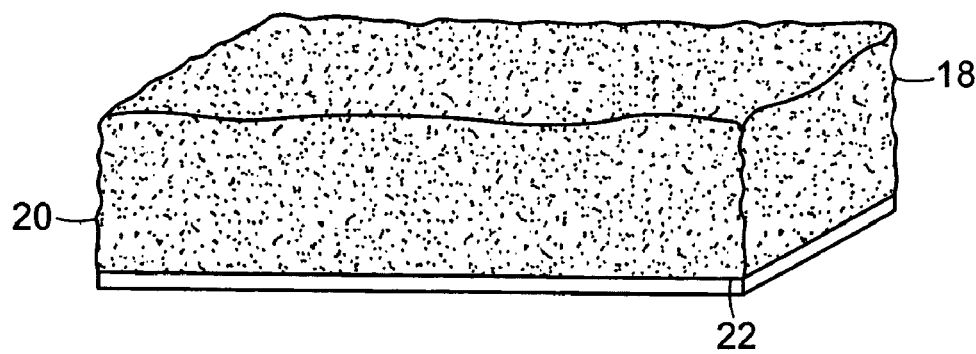
FIG. 3 is a representation of exemplary filter layers of a system of the invention.

FIG. 3 is a representation of an exemplary first and second filter layer of a system of the invention. As shown, the first 18 and second filter layer 20 can be disposed in communication with each other. For example, the first filter layer 18 can be disposed on a surface of the second filter layer 20. The first and second filter layer can also comprise a cover sheet. In FIG. 3, the second filter layer 20 features a cover sheet 22. The cover sheet 22 can be a polyester nonwoven material. Preferably, the first and second filter layer comprise a chemisorptive or physisorptive media for removing contaminants such as volatile silicon containing compounds.

Figure 4:
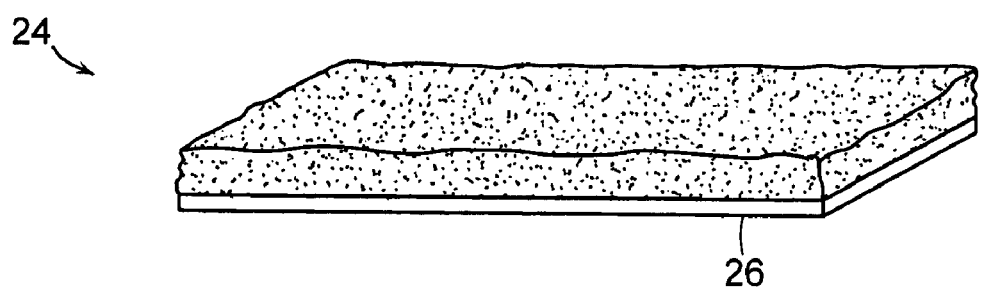
FIG. 4 is a representation of an exemplary filter layer of a system of the invention.
Figure 5:
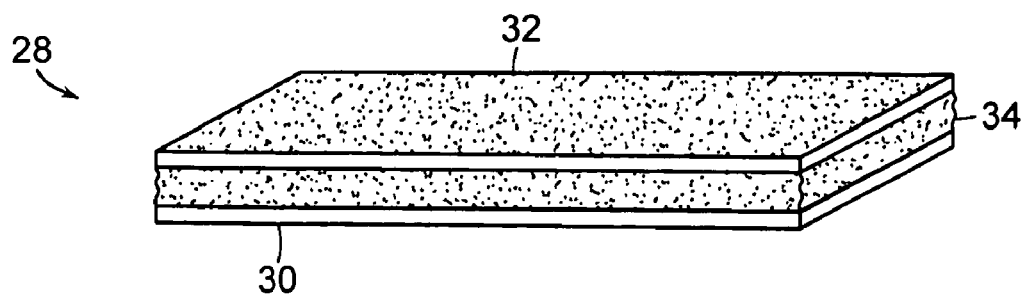
FIG. 5 is a representation of an exemplary filter layer of a system of the invention.

FIG. 4 is a representation of an exemplary filter layer of a system of the invention. As shown, the filter layer 24 comprises a cover sheet 26. In one embodiment, the cover sheet comprises a polyester nonwoven material. Preferably, the filter layer 24 comprises a chemisorptive or physisorptive media. FIG. 5 is also a representation of an exemplary filter layer of a system of the invention. As shown, the filter layer 28 comprises a first 30 and second cover sheet 32. The filter layer 28 also includes a body portion 34 disposed on the first cover sheet 30.

Exemplary cover sheets of filter layer of a system of the invention can comprise filtering or non-filtering nonwoven materials such as polyester, polyamide, polypropylene or any combination thereof. For example, a cover sheet comprising filtering nonwoven materials can remove particulates present in a gas stream passing therethrough. A cover sheet can also be used to retain honeycombed or pleated elements. In addition, a cover sheet can retain given medias such as, for example, activated carbon or beads comprising a sulfonated divinyl benzene styrene copolymer. Preferably, a cover sheet for a filter layer can comprise chemically inert materials such as, for example, polyester or polypropylene.

Figure 6:
FIG. 6 is a representation of an exemplary filter member of a filter layer for system of the invention.

For example, a filter layer of a system of the invention can be retained by any suitable container or framework. Such containers or frameworks are also useful in facilitating filter layer replacement. As described above, a filter layer can comprise a filter member having pleated elements. Pleated elements can increase filter member surface areas, which can aid in removing particulates or contaminants present in a gas flow path passing therethrough. FIG. 6 is a representation of an exemplary filter member of a filter layer for a system of the invention. As shown, the filter member 36 comprises a plurality of pleated elements 38. Each of the pleated elements 38 comprise chemisorptive or physisorptive media.

Figure 7:
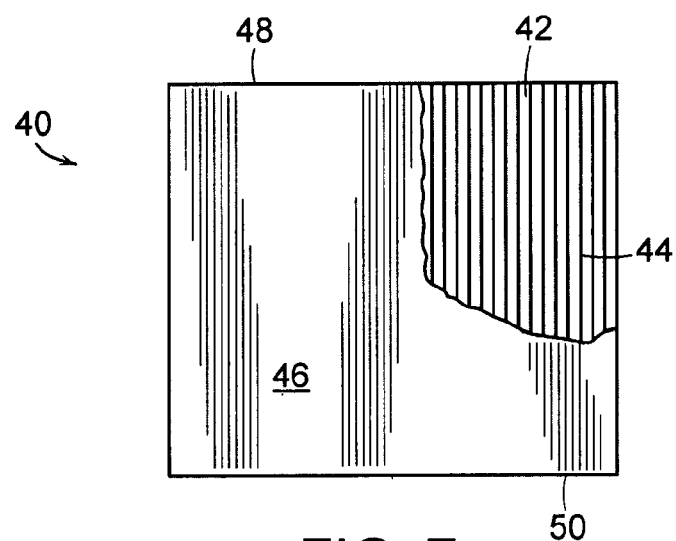
FIG. 7 is a representation of an exemplary filter member of a filter layer for system of the invention.
Figure 8:
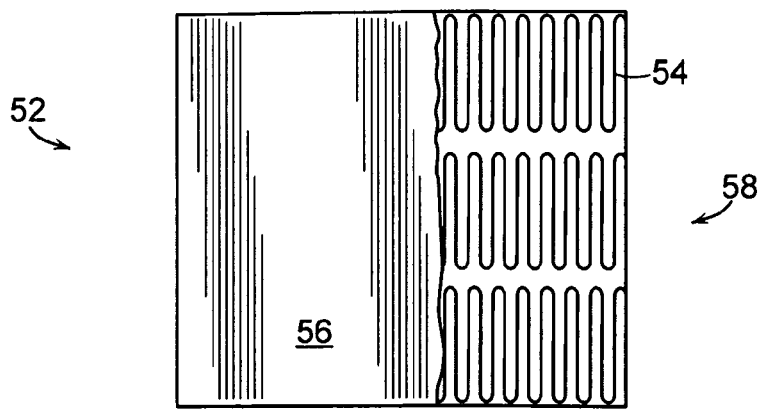
FIG. 8 is a representation of an exemplary filter member of a filter layer for system of the invention.

FIG. 7 is a representation of an exemplary filter member of a filter layer for a system of the invention. As shown, the filter member 40 comprises a plurality of elements 42. Preferably, the elements 42 are pleated into an accordion type structure 44. The structure 44 can be retained in a container 46 having a front 48 and back 50 for a gas stream to pass therethrough. In addition, FIG. 8 is a representation of an exemplary filter member of a filter layer for a system of the invention. FIG. 8 shows a filter member 52 comprising a plurality of elements 54. In one embodiment, the elements 54 are sequentially pleated in a container 56 to provide a plurality of accordion type structures 58 for multi-stage filtering.

In one embodiment, a filter layer of a system of the invention can comprise an ion exchange resin. Such ion exchange resins can feature porosities of higher than about 300 milliliters per gram. Preferably, an exchange resin of a filter layer of the system of the invention can be a cation exchange resin having a concentration of chemically acidic sites of about 1.8 milliequivalent per gram. For example, an exchange resin for a filter layer can include a surface area of about 45 squared meters per gram. Exemplary resins for a filter layer are commercially available under the tradename AMBERLYST (Rohm and Hass Company, 100 Independence Mall West, Philadelphia, Pa. 19106).

Preferably, filter layers of a system of the invention can be fabricated to exhaust over comparable periods of use. For example, the invention contemplates use of filter layers that concomitantly require maintenance or replacement. In one embodiment, a filter layer comprising a chemisorptive media can be fabricated to be thinner than a layer featuring a physisorptive media as physisorptive medias tend to exhaust prior to chemisorptive medias. A filtering system employing filter layers that exhaust over comparable periods of use can reduce operation costs by consolidating any potential downtime.

Figure 9:
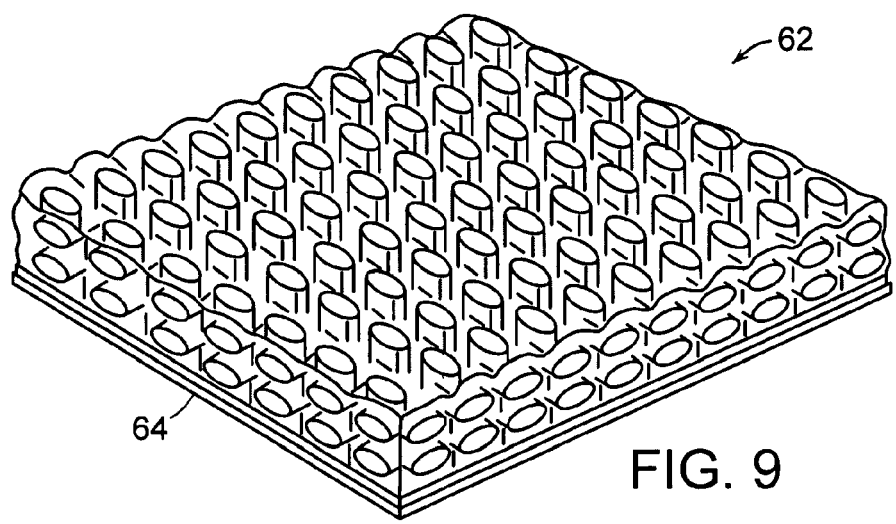
FIG. 9 is a representation of an exemplary filter layer of a system of the invention.

FIG. 9 is a representation of an exemplary filter layer of a system of the invention. In one embodiment, the filter layer 62 comprises a high surface area filter member. Moreover, the filter layer 62 can comprise a chemisorptive or physisorptive media and binder type materials. The filter layer 62 can be fabricated as generally described by U.S. Pat. Nos. 5,204,055, 5,340,656 and 5,387,380, which are incorporated by reference above. Preferably, a filter layer comprising a high surface area filter member includes a media disposed on, for example, a composite material 64. The binder type material can also be introduced to the media to aid binding thereof.

Figure 10:
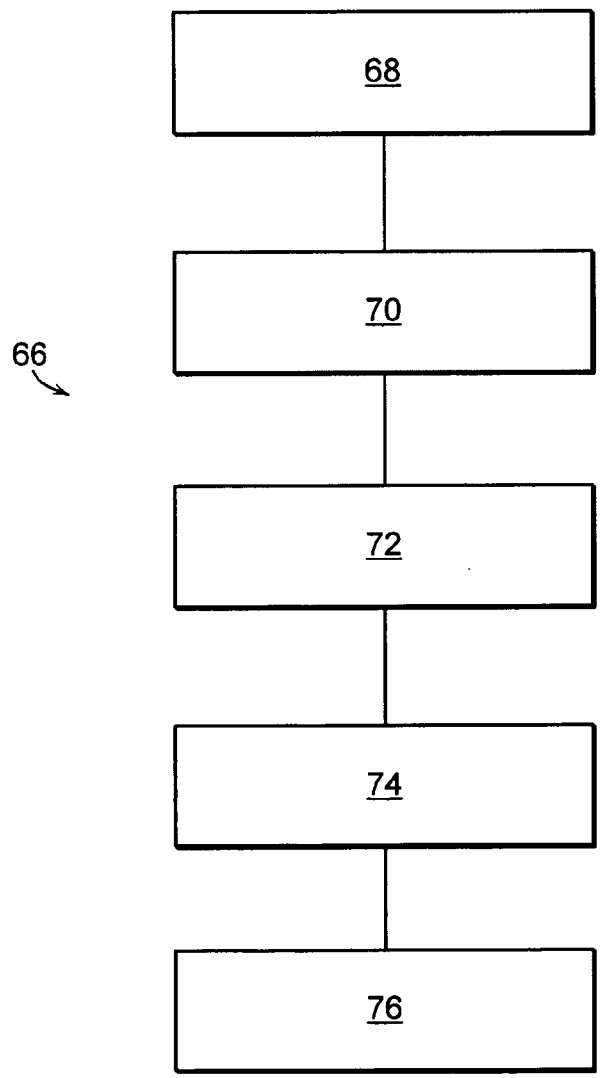
FIG. 10 is a representation of a method of the invention.

FIG. 10 is a representation of a method of the invention. The method 66 is performed to filter a gas stream such as a fluid flow path comprising air, which can be in communication with a semiconductor processing tool. As shown, the method 66 comprises a step 68 in which a filtering system of the invention is provided. Preferably, the system of the invention comprises a first and second filter layer. The method 66 also comprises a step 70 in which a fluid flow path is provided to the filtering system. For example, the fluid flow path can be a gas stream comprising particulates and contaminates such as volatile silicon containing compounds.

In one embodiment, the method 66 comprises a step 72 in which contaminants present within the fluid flow path are removed therefrom by a first filter layer. For example, the flow path can be an air stream comprising volatile silicon containing compounds such as hexamethyldisiloxane and trimethylsilanol. As shown, the method 66 of FIG. 10 comprises a step 74 in which contaminants from the fluid flow path are removed therefrom by a second filter layer. Preferably, the first and second filter layer comprise chemisorptive and physisorptive medias, respectively.

As described above, the medias of a first and second filter layer for a system of the invention are selected and arranged given particular contaminant concentrations. Preferably, with higher contaminant concentrations of hexamethyldisiloxane as compared to other volatile silicon containing compounds, the first and second filter layers comprise physisorptive and chemisorptive media, respectively. For a fluid flow path having higher contaminant concentrations of trimethylsilanol than other volatile silicon containing compounds, the first and second filter layers for the system comprise chemisorptive and physisorptive media, respectively.

The method 66 of FIG. 10 also comprises a step 76 in which the fluid flow path is introduced to a semiconductor processing tool. Preferably, the processing tool is disposed in a semiconductor cleanroom. As described above, the fluid flow path fluidly communicates with the tool. For example, the fluid flow path can be in fluid communication with a lithography tool such as a microlithography tool. The method 66 of FIG. 10 can also be performed in any suitable order, for example, removing contaminants via a second filter layer prior to a first.

While the present invention has been described herein in conjunction with a preferred embodiment, a person with ordinary skill in the art, after reading the foregoing specification, can effect changes, substitutions of equivalents and other types of alterations to the system or method as set forth herein. Each embodiment described above can also have included or incorporated therewith such variations as disclosed in regard to any or all of the other embodiments. Thus, it is intended that protection granted by Letter Patent hereon be limited in breadth and scope only by definitions contained in the appended claims and any equivalents thereof.

The invention claimed is:

1. A method of filtering a gas stream comprising hexamethyldisiloxane and trimethylsilanol contaminants, the gas steam being in communication with a semiconductor processing tool, the method comprising:

providing a filtering system having a first physisorptive filter layer and a second chemisorptive filter layer in fluid communication with a gas flow path wherein the first physisorptive filter layer is upstream along the gas flow path from the chemisorptive layer;

passing the gas stream through the first filter layer of the filtering system; and passing the gas stream through the second filter layer of the filtering system, to thereby remove hexamethyldisiloxane and trimethylsilanol contaminants from the gas stream.

2. The method of claim 1, further comprising employing the gas flow path in operation of the semiconductor processing tool.

3. The method of claim 1, further comprising flowing an air flow to the filtering system.

4. The method of claim 1, wherein the physisorptive media includes activated carbon.

5. The method of claim 1, wherein the chemisorptive media includes a cation exchange resin.

6. The method of claim 5, wherein the cation exchange resin includes a divinyl benzene styrene copolymer.

7. The method of claim 1, wherein the chemisorptive filter includes a divinyl benzene styrene copolymer with an acidic functional group.

8. The method of claim 7, wherein the acidic functional group comprises a sulfonic acid functional group or a carboxylic acid functional group.

9. The method of claim 1, wherein the first filter layer comprises a first filter member.

10. The method of claim 9, wherein the first filter member comprises honeycombed elements or pleated elements.

11. The method of claim 1, wherein the second filter layer comprises a second filter member.

12. The method of claim 11, wherein the second filter member comprises honeycombed elements or pleated elements.

13. The method of claim 1, wherein the semiconductor processing tool is a lithography tool.

14. The method of claim 13, wherein the lithography tool is a microlithography tool.

15. The method of claim 1, wherein the gas flow path comprises air.

16. The method of claim 1, wherein the chemisorptive media is chemically acidic.

17. The method of claim 1, wherein the semiconductor processing tool is an etching tool, deposition tool or an implantation tool.

18. The method of claim 1, wherein the semiconductor processing tool is disposed in a semiconductor cleanroom.

19. The method of claim 1, wherein the chemisorptive filter layer comprises a nonwoven carrier material.

20. The method of claim 19, wherein the nonwoven carrier material is polyester.

21. The method of claim 1, wherein the filtering system further comprises sampling ports for fluidly communicating with a monitoring device to evaluate filter layer performance.

* * * * *